United States Patent Office 3,009,135
Patented Nov. 14, 1961

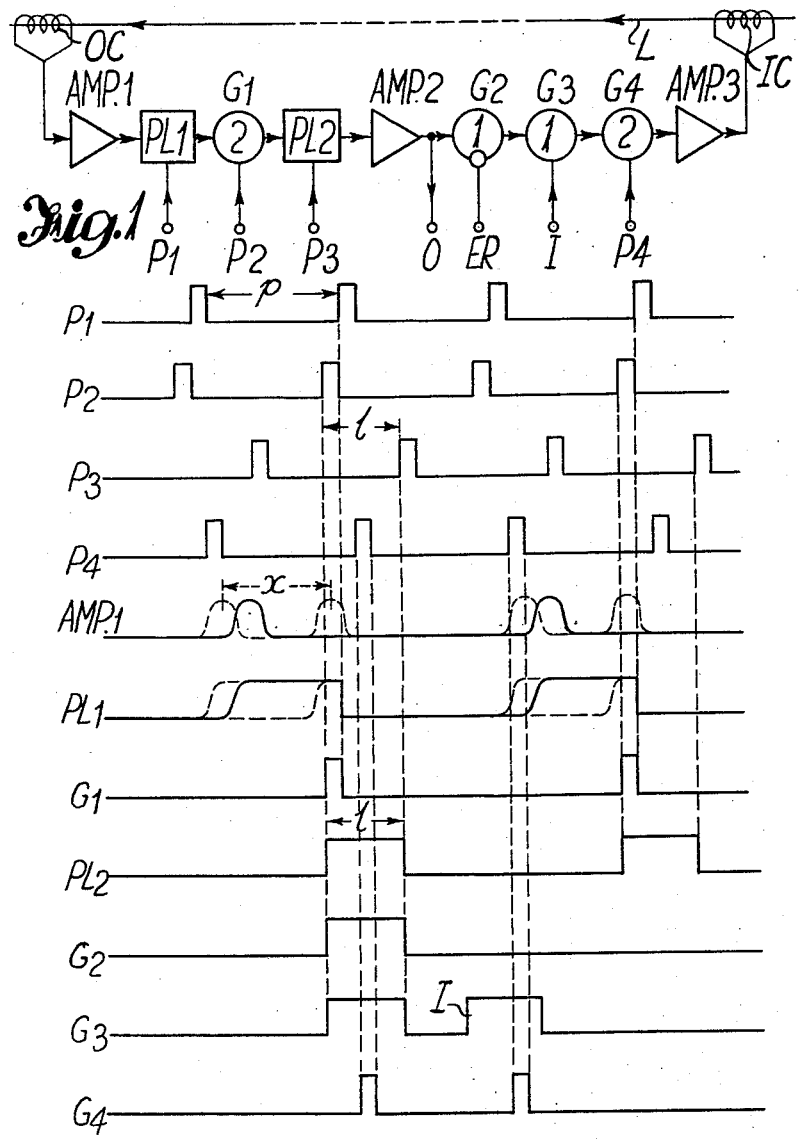

3,009,135
MAGNETO-STRICTIVE DELAY LINES
Herbert Alfred Showell, Chislehurst, and Christopher Wilfred Merefield Barrow, Dunton Green, near Sevenoaks, England, assignors to Siemens Edison Swan Limited, London, England, a British company
Filed Apr. 4, 1958, Ser. No. 726,446
Claims priority, application Great Britain Apr. 8, 1957
9 Claims. (Cl. 340—173)

This invention relates to so-called magneto-strictive or acoustic delay lines, which consist basically of a length of tape or wire of a ferromagnetic material coupled electromagnetically with an input coil adjacent one end and an output coil adjacent the other end, this latter coil being associated with a small permanent magnet which is positioned so as to set up a steady magnetic field through the coil. A varying current in the input coil causes changes in the magnetisation of the tape or wire which produce changes in its dimensions due to the well-known magnetostrictive effect. This produces a stress wave which results in longitudinal disturbances being propagated along the tape or wire, in both directions from the input coil, with a velocity V which is approximately equal to the speed of sound through the material and is given by the formula $$V = \sqrt{\frac{E}{d}}$$

where E is Young's modulus of elasticity and $d$ is the density of the material of wire or tape. The longitudinal stress waves travelling along the wire produce dimensional changes therein during their progress. In the portion of the wire passing through the output coil these dimensional changes vary the reluctance of the magnetic circuit provided by the permanent magnet and the resulting change of the flux causes small voltages to be induced into the windings of the output coil. The delay introduced by the delay line depends on the distance between the input and output coils and the speed of sound in the material used. There is no need for the acoustic path to be straight and the delay line may be coiled up so as to occupy only a small space.

Such a delay line finds application in the electronic art, in computers, in automatic telephone exchanges and so on, and may be of considerable length to give delays of the order of one to five milliseconds. The delay line may be used as a temporary information store, in which event its storage time is that of its delay, or as a circulating store in which signals from the output coil of the line are continuously fed back to the input coil for re-storage, so that the overall storage time for a given item of information may be any desired period. In either event it is common practice for successive items, or digits, of stored information to be represented by the presence or absence of a pulse in successive time periods which are respectively allocated to such items or digits and are usually defined between successive pulses in a train of "clock" pulses having a predetermined pulse repetition frequency; such time periods are hereinafter referred to as digit periods. Other trains of clock pulses, having the same pulse repetition frequency but different time phasing may be used for controlling various functions at predetermined time positions in each digit period.

It is also common, in utilising a magnetostrictive delay line for pulse storage, for the output pulses from the line to be gated by clock pulses to provide positively timed pulses which, after amplification if necessary, are made available for utilisation either directly or by way of a pulse lengthener in which they are lengthened to a desired duration. In a circulating store the output pulses, lengthened or not and with or without subsequent gating by clock pulses to produce a different time relationship with respect to the digit periods, are fed back to the input of the delay line unless they are erased beforehand in response, for intsance, to a change in the information to be stored.

Since the delay time of a magnetostrictive line is a function of the elastic constants and length of the line, it is therefore temperature-dependent. Consequently in using such lines for pulse storage, change in the temperature of the line and thus in its delay time will result in a change in the relative position in time of the output pulses from the line. Clock pulses intended to gate these output pulses may then not coincide with them fully or at all, resulting in a distorted output, or no output, being obtained from the gate.

Various proposals have been made hitherto with a view to overcoming this difficulty. For instance it has been proposed to control the clock pulse frequency from a similar delay line so that, as the temperature changes, the spacing between the clock pulses alters correspondingly and coincidence is thereby ensured. This presents the problem, however, of keeping the delay lines at the same temperature. Other proposals rely upon the output pulses being long enough, as obtained directly from the delay line, to allow their time position to change without losing coincidence with the clock pulses by which they are gated, while yet another proposal is to support the input and output coils of the delay line on bimetallic strips so that when the delay of the line alters with temperature the distance along the line between these coils will also be altered in such manner as to maintain the total delay constant. It has also been suggested to lengthen the pulses as received from the delay line and to utilise the lengthened pulses directly, but this has the disadvantage that as the delay of the line varies so the time position of the pulses received from the line alters and the length of the pulses as utilised also varies as a result.

With a view to avoiding the above difficulties or at least permitting a wider variation in the delay time without adverse consequences, it is proposed in accordance with the present invention to apply the output pulses from the delay line, after amplification if necessary, to a pulse lengthening circuit which produces lengthened pulses terminated towards the end of the digit periods in which the respective output pulses occur, and to gate the lengthened pulses by clock pulses timed to terminate substantially coincidentally with the termination of the lengthened pulses.

In this way, and assuming that each lengthened pulse terminates substantially coincidentally with the end of a digit period, being terminated for instance by the leading edge of a clock pulse defining the end of such period and the beginning of the next, the timing of the line output pulses can vary without adverse consequence by an amount commensurate with the length of one digit period less only the rise time of the output pulses as received from the delay line, a digit period being here considered as the period between the trailing edge of one clock pulse and the leading edge of the next clock pulse in the same train. The foregoing result is obtained because no matter where the onset of an output pulse occurs in a digit period (provided that it is the correct period), the pulse is lengthened to the end of the period and there gated to give a resultant pulse in a fixed time position, without possibility of non-coincidence of the clock pulses which effect the gating action.

The clock-gated pulses, that is, those obtained as a result of gating the lengthened pulses with the clock pulses, may be utilised directly or may first be applied to another pulse lengthener to obtain final output pulses of a required length for their ultilisation.

In applying the invention to a circulating storage system employing a magnetostrictive delay line, the clock-gated pulses would be fed back to the input of the delay line, preferably after being lengthened and gated by further clock pulses to ensure that the pulses applied to the delay line are of standard duration and in correct time position. As will be appreciated the extent of pulse lengthening required for this latter purpose has to be sufficient for the lengthened pulses to overlap in time the clock pulses by which they are to be gated. Where lengthened pulses are provided for utilisation as already indicated, these pulses may be of sufficient length to be gated for the feedback to the delay line. If longer pulses are required for this purpose, they may be obtained from a separate lengthening circuit fed with the clock-gated pulses referred to, or preferably, from an additional lengthening circuit fed with pulses gated at suitable times from the lengthened pulses derived for utilisation. It is contemplated that usually the feed-back pulses as applied to the delay line will be timed to occur near the beginning of respective digit periods, but in some cases it may be desirable, for reasons which will appear hereinafter, for these pulses to be delayed with respect to the beginning of their digit periods.

In order that the invention may be more readily and fully understood, reference will now be made to the accompanying drawings in which:

FIGS. 1, 3 and 5 are logical diagrams of respective circulating storage systems each employing a magnetostrictive delay line and embodying the invention;

FIGS. 2, 4 and 6 illustrate, in idealised form, the waveforms of the pulse trains required for the embodiments of FIGS. 1, 3 and 5 respectively, and also the waveforms appearing at the outputs of some of the circuits which together constitute these embodiments;

Figure 8:
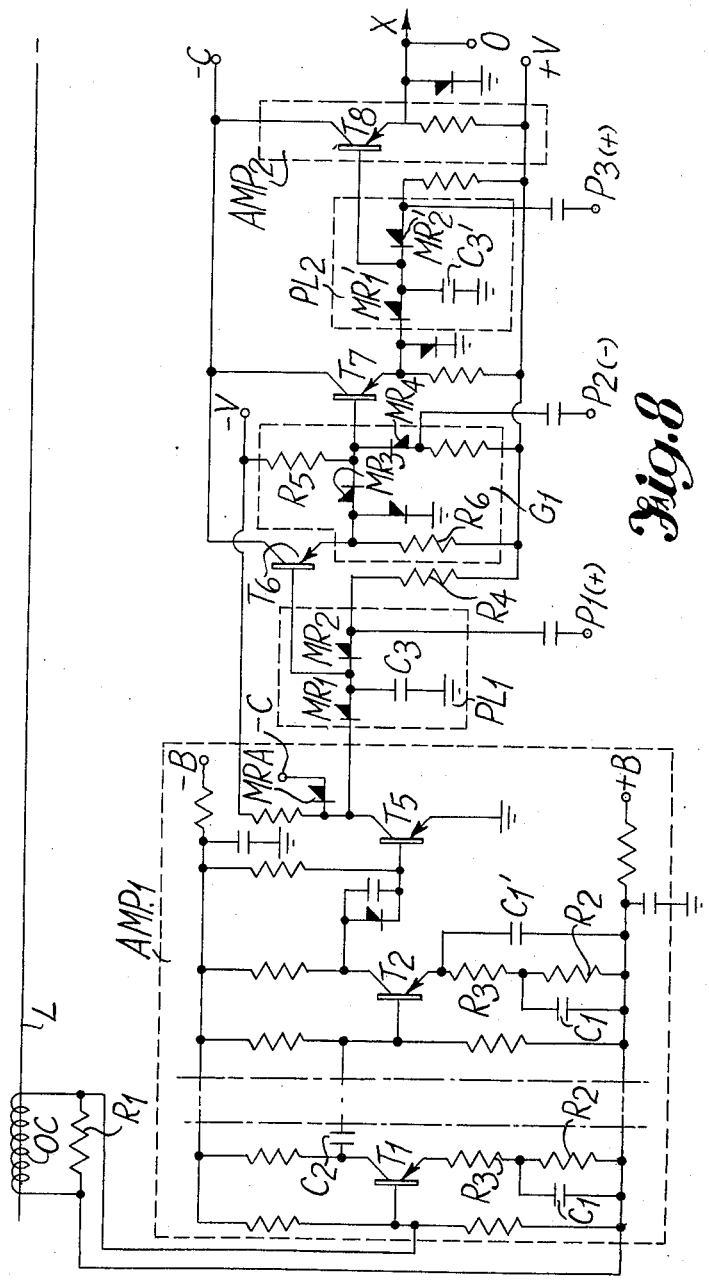
Figure 9:
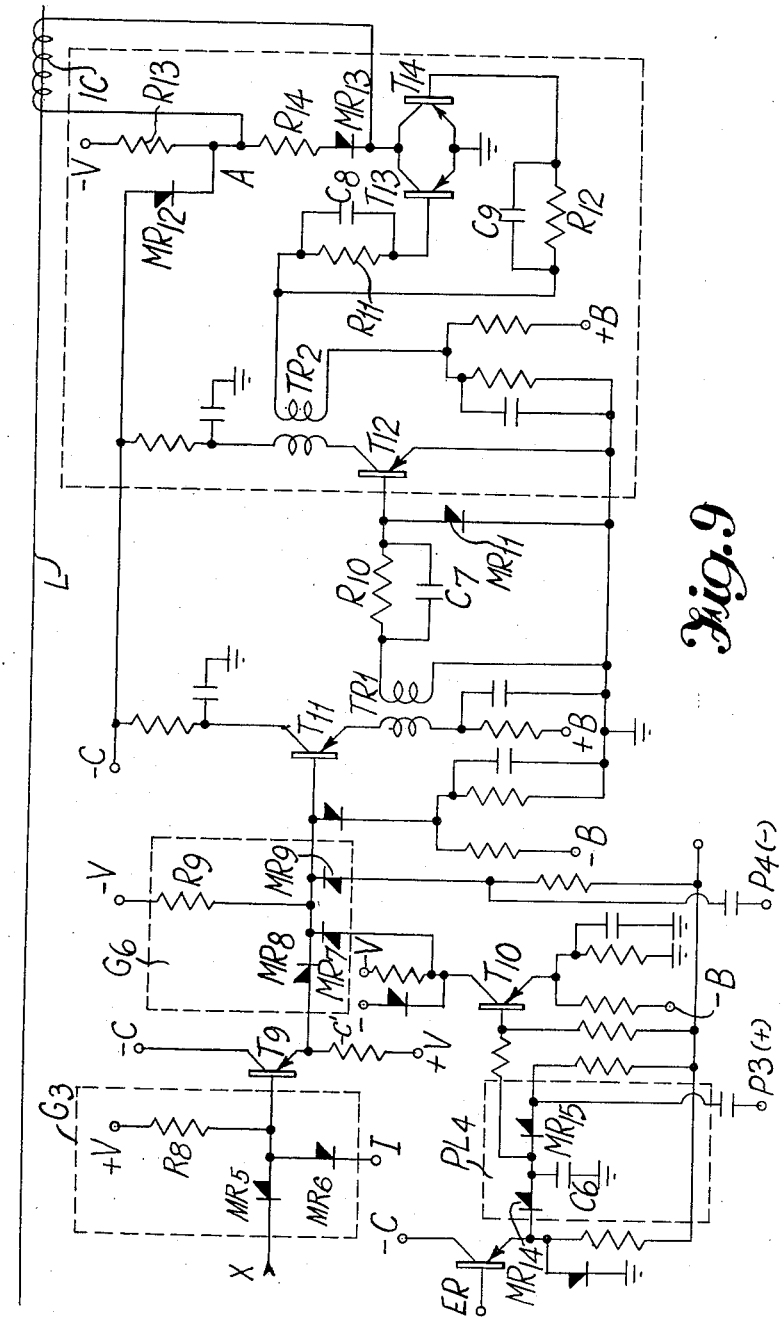

FIG. 8 is a detail diagram of output circuitry by which an output pulse from the delay line can be presented in a suitable form for utilisation; and FIG. 9 is a detail diagram of input circuitry by which an output pulse from the delay line can be fed back into the line for re-circulation or erased from circulation, this circuitry also permitting insertion of new pulses for circulation in the storage system.

Figure 3:
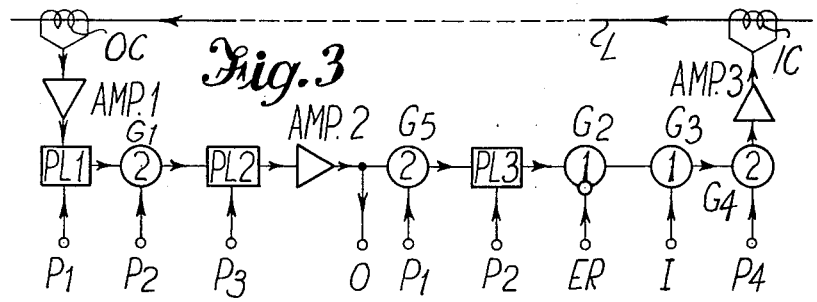
Figure 5:
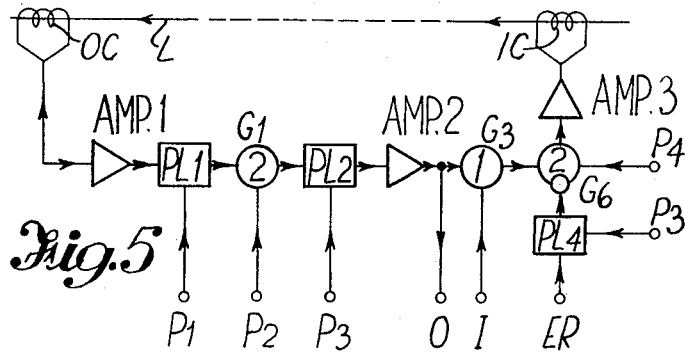

FIGS. 8 and 9 taken together illustrate a practical overall circuit for the embodiment logically illustrated in FIG. 5; they also serve to illustrate possible forms for the circuits constituting the logically illustrated embodiments of FIGS. 1 and 3.

The embodiments of FIGS. 1, 3 and 5 each require four trains of clock pulses which in the following description are termed the P1, P2, P3 and P4 pulse trains respectively. These pulse trains are illustrated by correspondingly labelled lines in each of FIGS. 2, 4 and 6. The P1 pulse train in each case defines successive digit periods $p$ between the trailing edge of one pulse and the leading edge of the next; the pulses in the P2 pulse train are timed to terminate coincidentally with the leading edges of those in the P1 train; the P3 pulses are timed to occur after the P2 pulses with a time interval equal to the required pulse length $l$ for the pulses made available for utilisation; and the P4 pulses are timed to coincide with the time positions in each digit period at which it is desired to insert the fed back pulses, together with any new input pulses, into the delay line; for the embodiment of FIG. 1 the P4 pulses occur close to the beginning of the digit periods (having their leading edges coincident with the trailing edges of the P1 pulses), whereas for the embodiments of FIGS. 3 and 5 the P4 pulses have time positions nearer the end of the digit periods.

In each embodiment the output circuitry is logically similar and will be described first. The pulses obtained from the output coil OC (FIGS. 1, 3 and 5) of the magnetostrictive delay line L are amplified and clipped in a circuit designated AMP1 and then passed to a first pulse lengthener PL1 which extends each of these pulses until it is terminated, at the end of the digit period $p$ in which it occurs, by means of the next P1 pulse to occur; the P1 pulse train is applied to the pulse lengthener PL1 for this purpose. Practical forms of pulse lengthener will be described later. The output from the pulse lengthener PL1 is applied to a coincidence or "AND" gate G1 to which is also applied the P2 pulse train. Since the P2 pulses occur immediately in advance of the trailing edges of the lengthened pulses from lengthener PL1 (see FIG. 2), each of these lengthened pulses, no matter where its onset takes place in the digit period, will be gated in the gate G1 by a P2 pulse, thus giving an output pulse coincident with the latter. This output pulse from gate G1 is applied, together with the P3 pulse train, to a second pulse lengthener PL2 and is extended thereby until terminated on occurrence of the next P3 pulse. The resultant output from the pulse lengthener PL2 is therefore a pulse having a length $l$ equal to the time by which the P3 pulse lags behind the preceding P2 pulse. The output pulses from the pulse lengthener PL2, having thus the desired length for utilisation, are amplified in amplifier AMP2 and passed to a utilisation circuit (not shown) by way of the output terminal O.

To complete the circulation system, pulses derived from the amplified output of the pulse lengthener PL2 are fed back to the input coil IC of the relay line L with appropriate timing. Since the embodiments of FIGS. 1, 3 and 5 differ as regards the input circuitry which is included for all purpose and is now about to be described, they will be considered separately.

In the embodiment of FIG. 1, which caters for the case in which insertion of pulses into the delay line L is required to occur at the beginning of the digit periods $p$, the amplified output from the pulse lengthener PL2 is applied through an "erase" gate G2 and an input gate G3 to a timing coincidence gate G4 to which is also applied the P4 pulse train; as previously indicated, the pulses in this train are timed, for this embodiment, to occur immediately after the P1 pulses. The "erase" gate G2 has an inhibit lead over which, in any digit period, an inhibiting signal can be applied to the gate from terminal ER, thereby to block any pulse occupying that digit period and consequently remove it from circulation. The inhibit lead is shown conventionally as terminating in a small circle on the main circle which, together with arrow-headed input and output leads constitutes the logical symbol for a gate. The input gate G3 permits a pulse applied at terminal I to be inserted into the delay line in any digit period. The output from the timing gate G4, being in the form of pulses occurring at the beginning of respective digit periods and having the same lengths as the P4 pulses, is amplified in a driving amplifier AMP3 and applied to the input coil IC of the delay line L.

Where a delay line is to be used in a system in which circuit delays are incurred, the output pulses derived for utilisation from the delay line may be required to be advanced in time. This can be achieved by shortening the effective length of the delay line by the amount of advanve required and make up the full delay time by imposing a delay on the circulating pulses at a position in the circulation path beyond that from which the output pulses are taken for utilisation. If the delay then required in the circulation path is less than the length of the output pulses from the pulse lengthener PL2 in the embodiment of FIG. 1, this delay can be obtained simply by using a P4 pulse train which has its pulses delayed with respect to the beginning of the digit periods by an appropriate amount, instead of occurring immediately following the P1 pulses.

The embodiment of the invention illustrated by FIG. 3 caters for longer delays than this by including in the circulation path an additional pulse lengthening stage PL3 the output of which is gated by P4 pulses occurring nearer the end of the digit periods (see FIG. 4) than do the P4 pulses for the embodiment of FIG. 1. Referring to FIG. 3, which is the same as FIG. 1 up to the amplifier AMP2, the amplified output from the pulse lengthener PL2 is applied to a coincidence gate G5 to which is also applied the P1 pulse train. The pulse output from this gate G5 is applied, together with the P2 pulse train, to the additional pulse lengthener PL3 by which each pulse from gate G5 is extended until terminated by a P2 pulse (see FIG. 4). The output from the pulse lengthener PL3 is then applied, by way of the erase gate G2 and input G3, to the timing gate G4 in which, as before, it is gated by the P4 pulses, to provide an output which coincides with the P4 pulses and is applied after amplification to the input coil IC of the delay line L.

If still greater delay is required in the circulating system to permit greater advance in time of the delay line output, this may be catered for by the inclusion of further pulse lengthening and gating stages.

If, instead of a circulating system, only a temporary storage system is required, a logical arrangement similar to that illustrated in FIGS. 1, 3 or 5 could be employed omitting all circuitry between the amplifier AMP2 and the input gate G3 and, also omitting, in the case of FIG. 5, the inhibiting circuitry associated with gate G6. The input gate G3 could then also be omitted and the input lead from terminal 1 taken directly to the gate which follows G3.

Figure 4:
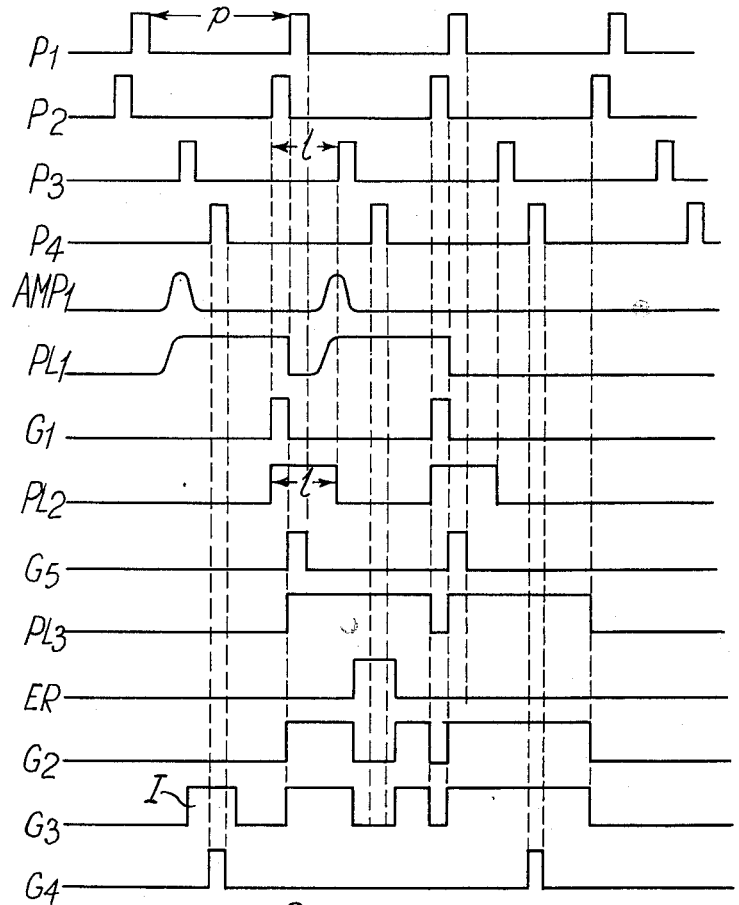

As will be appreciated from the foregoing descriptions of FIGS. 1 and 3 considered in conjunction with FIGS. 2 and 4 respectively, the erase gate G2 will properly fulfil its function only if an inhibiting signal applied to it completely overlaps the P4 pulse which occurs in the digit period from which a circulating pulse has to be removed. To ensure this, especially where the nature of the external circuitry is such that an inhibition may vary in its duration and in its position in a digit period, an arrangement such as that employed in the embodiment of FIG. 5 may be used. Moreover it is possible, as in the FIG. 5 embodiment, to combine the erasing and timing functions of the gates G2 and G4 in a single gate G6.

Referring to FIG. 5, which is again the same as FIG. 1 up to the amplifier AMP2, the amplified output from the pulse lengthener PL2 is applied directly to the "OR" gate G3 where it is combined with any new input pulses that are to be inserted in the delay line, these new input pulses being applied at terminal I. The combined output of gate G3 then passes to a timing and inhibiting "AND" gate G6 which also receives the P4 pulses. This gate G6 has an inhibiting lead over which it receives lengthened inhibiting pulses applied at terminal ER and lengthened in a pulse lengthener PL4. Each lengthened inhibiting pulse is terminated by a P3 pulse, the P3 pulse train being for this purpose applied to the pulse lengthener PL4. Consequently, provided that an inhibiting pulse applied at terminal ER occurs before the P4 pulse for the relevant digit period—a requirement which would be taken care of in the design of the external circuits—the lengthened inhibiting pulse as applied to gate G6 will block the gate for a period overlapping that of the P4 pulse, thus preventing a pulse from the gate G3 from being applied to the delay line L. In the absence of inhibiting pulses on gate G6 pulses received thereby from the gate G3 are gated as before by the P4 pulses, thereby providing from the gate G6 an output which coincides with the P4 pulses and is applied after amplification to the input coil IC of the delay line L.

Figure 7:
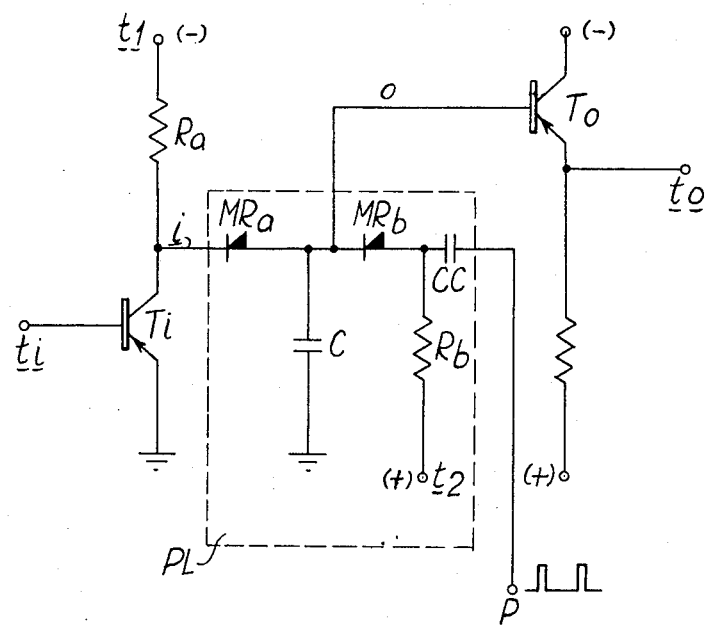
FIG. 7 is a circuit diagram of a practical form for the pulse lengtheners included in the embodiments of FIGS. 1, 3 and 5.

In carrying out the invention, the, or each, pulse lengthener employed may take the form of a bistable circuit which takes up one of its stable conditions on receipt of a pulse to be lengthened and reverts to its other condition only on receipt of a pulse provided by whichever clock train controls the termination of the lengthened pulse. The lengthened pulse is then constituted by a signal persisting while the lengthener is in the first-mentioned of its two conditions. Thus each pulse lengthener may basically comprise a capacitor which is charged by the incoming pulse to be lengthened and remains charged until discharged at a specific instant under control of the next of the applied clock pulses to occur. More specifically, although other forms may be used, each of the pulse lengtheners may take the form illustrated in FIG. 7. Referring to this figure, a pulse to be lengthened is applied at terminal $ti$, in positive-going sense, to the base of an earthed-emitter transistor $Ti$ the collector of which is connected through a resistor $Ra$ to a negative terminal $t1$. The collector of transistor $Ti$ is also connected, over a connection $i$ constituting the input to the pulse lengthener PL proper, to a first rectifier $MRa$ and thence through a capacitor $C$ to earth, the rectifier $MRa$ being poled to conduct towards the transistor collector. The junction of the capacitor $C$ and rectifier $MRa$ is connected through a second rectifier $MRb$ and a resistor $Rb$, in that order, to a positive terminal $t2$, while the junction of rectifier $MRb$ and resistor $Rb$ is connected through a coupling capacitor $CC$ to a terminal P to which the train of terminating clock pulses, in positive-going sense, is applied. The rectifier $MBb$ is poled to conduct away from this terminal P. The transistor $Ti$ is normally conductive with its collector just $(-)ve$ to earth, but the arrival at terminal $ti$ of a pulse to be lengthened stops the conduction and causes the collector potential to change to that of the negative terminal $t1$. The capacitor $C$ consequently charges through the rectifier $MRa$ and resistor $Ra$. When the input pulse ceases the transistor returns to its conductive state. The rectifiers $MRa$, $MRb$ are then both held non-conducting and the capacitor $C$ remains charged until a (positive) clock pulse arrives by which the rectifier $MBb$ is rendered conducting and the capacitor $C$ is discharged. Thus when an input pulse is applied to the base of the transistor, a voltage is produced across capacitor $C$ and remains until the arrival of the terminating clock pulse. This voltage is applied, over an output lead $o$ for the pulse lengthener, to the base of a second transistor $To$ which may be, and as shown in FIG. 7 is, connected as an emitter-follower so that it presents a relatively high input impedance and therefore does not materially affect the charge on the capacitor $C$ during the period of the required lengthened pulse, this pulse being taken at terminal $to$ from the emitter of the output transistor $To$. Alternatively, as circuit requirements may dictate, the output transistor may have a load resistor connected in its collector circuit and the lengthened pulse taken from the collector.

Referring now to the delay line output circuitry illustrated in FIG. 8, the output from the output coil OC of the delay line L is developed across a resistor R1 and is applied to the input of a multi-stage amplifying and clipping circuit AMP1 of which only the first and last amplifying stages, comprising transistors T1 and T2 respectively, and the clipping stage are shown, any intermediate amplifying stages being similar to the last stage. In each amplifying stage the transistor has a grounded emitter configuration, its emitter circuit including two series connected resistors R2 and R3. The larger (R2) of these two resistors is decoupled by a capacitor C1 to stabilise the D.C. working point, while the smaller (R3) of the two resistors provides negative feedback for the stage. Also, in each amplifier stage except the first, a high frequency decoupling capacitor C1' is provided to counteract negative feedback at high frequencies and so extend the high frequency response of the amplifier, this capacitor being omitted from the first stage since the capacitor of the delay line output coil OC will usually be sufficient. Coupling between the transistors in successive amplifier stages is from collector to base, using a suitably dimensioned coupling capacitor such as C2.

Figure 6:
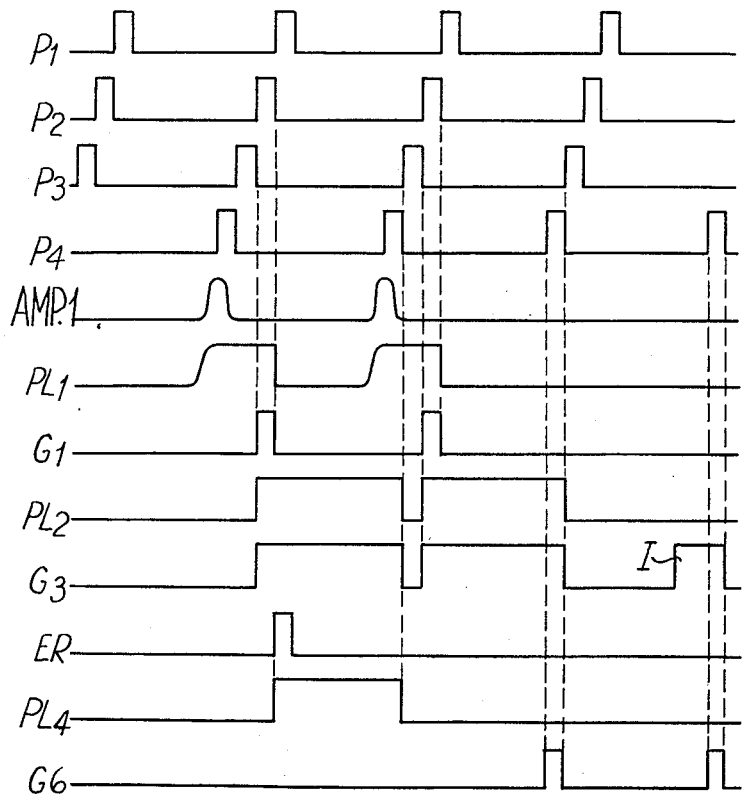

The output from the amplifying stages, taken from the collector of transistor T2 in the last stage, is applied to a pulse clipping transistor T5. The function of this transistor is to invert and limit the output pulses from the amplifying stages and also remove any spurious signals due to small echoes or the like on the delay line L. To achieve these functions, the transistor T5 is arranged to be normally conducting due to the negative bias potential (−B) applied to its base. On receipt of a positive pulse of suitable amplitude from the collector of transistor T2 however, transistor T5 is cut off and the potential on its collector thus rises towards the negative supply potential (−V) until clamped to a negative potential (−C) by conduction through a rectifier MRA. The output pulses from T5 which have a shape somewhat as shown in FIG. 6 are applied to a pulse lengthener PL1 formed by the rectifiers MR1 and MR2 and the capacitor C3. The operation of this pulse lengthener is that the negative pulse from T5 charges capacitor C3 through the forward impedance of MR1. The junction of MR1, MR2 and C3 therefore attains a negative potential equal in magnitude to the input pulse from T5. When the potential of the T5 collector returns to earth potential when transistor T5 again conducts, MR1 is backed off and the only paths for the charge on C1 to leak away are through the back resistance of MR1 and through the forward resistance of MR2 in series with a resistor R4 to the positive supply terminal (+V). The time constant of this latter discharge path is made long compared with the time duration of a digit period for the delay line, but towards the end of such period the capacitor C3 is rapidly discharged by a P1 pulse, applied via capacitor C4. Thus a lengthened pulse is produced the leading edge of which depends on the output from the delay line but the trailing edge of which substantially coincides with the leading edge of the pulse P1.

The lengthened pulse from the pulse lengthener PL1 is applied to an emitter-follower transistor T6, the output from which is applied to an "AND" gate formed by rectifiers MR3, MR4 and resistors R1, R3 and R4. To this gate G1 is also applied the clock pulses P2 which are negative pulses occurring in advance of P1 pulses. Consequently a small portion of the tail end of the lengthened pulse from PL1 is passed by the gate G1 and applied, via a further emitter-follower transistor T7 to a second pulse lenghener PL2. This pulse lengthener PL2, comprising rectifiers MR1′, MR2′ and capacitor C3′ is identical in form to PL1 but in this case the lengthened pulse is terminated by a P3 pulse, so that the output from the lengthener PL2 is a lengthened pulse the onset and termination of which is accurately defined in time by the clock pulses P2 and P3 respectively. This lengthened pulse is applied to a further emitter-follower transistor T8 the output from which, appearing at terminal O, is taken as the delay line output for utilisation in external circuitry (not shown). In addition, where the delay line is acting as a circulating pulse store rather than just a temporary store, another output connection X is taken from T8 and connected to the delay line input circuitry.

Turning now to the delay line input circuitry illustrated in FIG. 9, the output connection X from transistor T8, FIG. 8 and an input signal lead I from external circuits (not shown) are connected to an "OR" gate G3, formed by rectifiers MR5, MR6 and resistor R8, through which existing stored pulses are allowed to circulate or new pulses are inserted for storage. The output from this gate is applied to an emitter-follower transistor T9 and thence taken from the emitter to an inhibiting coincidence gate G6 formed by rectifiers MR7, MR8, MR9, and resistor R9. This gate G6 has three inputs of which the one through MR7 is the inhibiting "erase" input, the second through MR8, is the storage signal input, and the third through MR9 is the P4 pulse input. For erasing a circulating pulse a short negative pulse is applied in the appropriate digit period to the "erase" terminal ER. This pulse, reproduced by an emitter-follower transistor, is lengthened by a pulse lengthener PL4 formed by rectifiers MR14, MR15, and capacitor C6 and is terminated by a P3 pulse, the P3 pulses occurring just after the P4 pulses. The output from the pulse lengthener PL4 is inverted by transistor T10 the collector potential of which clamped to a potential −C₁, is applied to the gate G3 via MR7. Thus for the duration of the lengthened "erase" pulse the potential at the collector of transistor T10 assumes a value which effectively inhibits the gate G6 against responding to the cincident receipt of pulses at its other two inputs. In the absence of an inhibiting erase signal applied at terminal ER, the receipt of coincident pulses at the other two inputs (to MR8 and MR9 respectively) results in a pulse coincident with a P4 pulse being passed through the gate G6 in a manner similar to that described above for the gate G1.

The output from the gate G6 is applied to an emitter-follower transistor T11 which is transformer-coupled over transformer TR1 to a transistor T12 in a driving amplifier AMP3. In this circuit a resistance R10 decreases the load on the emitter-follower transistor T11 whilst the inclusion of a capacitor C7 increases the initial current in the base of transistor T12. A rectifier MR11 helps to ensure D.C. restoration of the output from the coupling transformer TR1 when there are pulses stored in successive digit periods of the storage system. The output from transistor T12 is coupled through a matching transformer TR2 to the bases of transistors T13 and T14 via resistors R11 and R12, and high frequency compensating capacitors C8 and C9. Transistors T13 and T14 have their collectors and emitters strapped together because the dissipation of this stage, which feeds the input coil IC of the delay line, is likely to be too large for one transistor. The collector circuit is common to the two transistors and includes the input coil IC, a resistor R13 and a rectifier MR12. Resistor R13 and rectifier MR12 act as a partial current limiting circuit which is ineffective until the potential of point A, in the collector circuit has fallen to a potential less than C when rectifier MR12 becomes cut off and the whole current supply has to come from the source −V via resistor R13. By this means the onset of the pulse in the input coil is steepened. Resistor R14 and rectifier MR13 damp out the counter E.M.F. from the coil IC thus preventing it from reaching such an amplitude as to damage the transistor T13 and T14.

What we claim is:

1. In combination with a magnetostrictive delay line, a first pulse lengthening circuit connected to receive output pulses from the delay line in respective digit periods and also to receive terminating pulses timed to terminate the lengthened pulses towards the ends of the digit periods, a coincidence gate connected to receive as inputs thereto these lengthened pulses on the one hand and gating clock pulses timed to terminate substantially coincidentally with the ends of the lengthened pulses on the other hand, and a second pulse lengthening circuit producing pulses for utilization, which second pulse lengthening circuit is connected to receive the pulses produced from said coincidence gate and also to receive terminating pulses timed in relation to said clock pulses according to a required length for said utilization pulses.

2. A magnetostrictive delay line combination as claimed in claim 1 employing, for pulse lengthening a bi-stable circuit connected to receive pulses to be lengthened, said pulses being effective to put the bistable circuit into one of its stable conditions, and also clock pulses timed to occur in the digit periods at the times therein at which the lengthened pulses are required to be terminated said clock pulses being effective to put the bistable circuit into its other stable condition, the required lengthened pulse being produced by said circuit in the first of said conditions.

3. A magnetostrictive delay line combination as claimed in claim 2 wherein such bi-stable circuit comprises a capacitor connected for charging by a pulse received for lengthening and for discharging at a specific time under control of the next clock pulse received the capacitor retaining its charge between said charging and discharging.

4. In combination with a magnetostrictive delay line, a first pulse lengthening circuit connected to receive output pulses from the delay line in respective digit periods and also to receive terminating pulses timed to terminate the lengthened pulses towards the end of the digit periods, a coincidence gate connected to receive as inputs thereto these lengthened pulses on the one hand and gating clock pulses timed to terminate substantially coincidentally with the ends of the lengthened pulses on the other hand, a second pulse lengthening circuit producing pulses for utilization, which second pulse lengthening circuit is connected to receive output pulses from said coincidence gate and also to receive terminating pulses timed in relation to said clock pulses according to a required length for said utilization pulses, and input circuitry establishing a circulating system for the delay line and including a timing coincidence gate connected to receive as one input thereto output pulses from the second pulse lengthening circuit and as the other input thereto gating pulses timed to produce from said timing gate as input pulses to the delay line, pulses having the required timing for such input pulses.

5. A magnetostrictive delay line combination as claimed in claim 4 wherein the lengthened pulses produced by the second pulse lengthening circuit overlap in time the times in the respective digit periods at which it is desired to apply the input pulses to the delay line, and wherein said timing coincidence gate is connected to receive as inputs thereto the lengthened pulses from the second lengthening circuit together with clock pulses timed to occur in the digit periods at said times therein.

6. In a magnetostrictive delay line combination as claimed in claim 4, a coincidence gate connected to receive as inputs thereto the lengthened pulses from the second pulse lengthening circuit and clock pulses timed to occur in the digit periods within the periods occupied by these lengthened pulses, and at least one subsequent lengthening and gating stage comprising a pulse lengthening circuit and a coincidence gate of which the lengthening circuit is connected to receive pulses from the preceding coincidence gate and also to receive terminating pulses timed to terminate the resultant lengthened pulses at predetermined times in the digit periods, while the coincidence gate of the stage is connected to receive as inputs thereto the lengthened pulses from the pulse lengthening circuit of the stage together with gating clock pulses timed to occur in the digit periods within the periods occupied by the received lengthened pulses, the last of all said coincidence gates constituting said timing gate having the clock pulses applied thereto timed to occur at the times in the digit periods at which it is desired to apply the input pulses to the delay line.

7. A magnetostrictive delay line combination as claimed in claim 4 wherein the input circuitry includes, prior to the timing gate, an input gate permitting new input pulses to be added to those in circulation and an inhibiting "erase" gate permitting pulses to be removed from circulation by inhibiting them at said "erase" gate.

8. A magnetostrictive delay line combination as claimed in claim 4 wherein the input circuitry includes, prior to the timing gate, an input gate permitting new input pulses to be added to those in circulation and wherein the timing gate also has an inhibiting lead permitting pulses to be removed from circulation by inhibiting them at the timing gate.

9. A magnetostrictive delay line circulating system providing time-advanced utilization pulses, said system comprising, in combination with a magnetostrictive delay line having a delay time shorter than the total circulating time by an amount corresponding to the required time advance of the utilization pulses, a first pulse lengthening circuit connected to receive output pulses from the delay line in respective digit periods and also to receive terminating pulses timed to terminate the lengthened pulses towards the end of the digit periods, a coincidence gate connected to receive as inputs thereto these lengthened pulses on the one hand and gating clock pulses timed to terminate substantially coincidentally with the ends of the lengthened pulses on the other hand, a second pulse lengthening circuit producing pulses for utilization, which second pulse lengthening circuit is connected to receive output pulses from said coincidence gate and also to receive terminating pulses timed in relation to said clock pulses according to a required length for said utilization pulses, and input circuitry for the delay line including a timing coincidence gate connected to receive as one input thereto output pulses from the second pulse lengthener and as the other input thereto gating pulses timed to produce from said timing gate pulses occurring at times representing an additional delay which together with the delay time of the delay line makes up the total delay time.

References Cited in the file of this patent

UNITED STATES PATENTS 2,495,740     Labin et al. _____ Jan. 31, 1950

OTHER REFERENCES

"Automatic Digital Computation," Proc. of a Symp. National Physics Laboratory, Mar. 25, 1953, pp. 199–210.